United States Patent
Seeley et al.

(10) Patent No.: US 6,561,600 B1
(45) Date of Patent: May 13, 2003

(54) IN-FLIGHT ENTERTAINMENT LCD MONITOR HOUSING MULTI-PURPOSE LATCH

(75) Inventors: S. Scott Seeley, Corona, CA (US); Gerald E. Lester, Costa Mesa, CA (US); Richard C. Mell, Brea, CA (US); Stephen R. Boss, Claremont, CA (US); James R. Dan, Yorba Linda, CA (US)

(73) Assignee: Rockwell Collins, Cedar Rapids, IA (US)

( * ) Notice: Subject to any disclaimer, the term of this patent is extended or adjusted under 35 U.S.C. 154(b) by 0 days.

(21) Appl. No.: 09/660,720

(22) Filed: Sep. 13, 2000

(51) Int. Cl.[7] ................................. A47B 81/06
(52) U.S. Cl. ..................... 312/257.1; 348/838; 312/7.2
(58) Field of Search ................. 312/305, 308, 312/326, 328, 7.2, 257.1; 348/838, 842, 841, 843

(56) References Cited

U.S. PATENT DOCUMENTS

| | | | | |
|---|---|---|---|---|
| 5,379,182 A | * | 1/1995 | Fujimori et al. | 361/681 |
| 5,633,660 A | * | 5/1997 | Hansen et al. | 345/173 |
| 6,169,582 B1 | * | 1/2001 | Lee | 348/794 X |
| 6,330,148 B1 | * | 12/2001 | Won et al. | 361/681 |

\* cited by examiner

Primary Examiner—John G. Weiss
Assistant Examiner—Michael J. Fisher
(74) Attorney, Agent, or Firm—Nathan O. Jensen; Kyle Eppele

(57) ABSTRACT

An on-board entertainment display housing system for mounting flat panel displays, incorporating a plurality of interlocking extensions on a pair of mated panels coupled via a cam lock that provides operational support and rapid maintenance access to the flat panel.

1 Claim, 3 Drawing Sheets

IN-FLIGHT ENTERTAINMENT LCD MONITOR HOUSING MULTI-PURPOSE LATCH

BACKGROUND OF THE INVENTION

This invention relates to entertainment systems and more specifically to housing assemblies integrated into entertainment systems utilized on transportation vehicles.

Today's world involves numerous situations in which one is required to endure trips of varying distance and time for both pleasure and work reasons. To accomplish these travels a wide assortment of personal and commercial vehicles including automobiles, buses, ships, trains and aircraft are relied upon on a daily basis. For those individuals not operating the respective vehicle, the duration of the trip provides a captive situation which is often addressed by access to wireless broadcast information, such as television, or viewing pre-recorded information stored on the vehicle for playback during the trip. Such systems are often referred to as in-flight or mobile entertainment systems. With advances in electronics in recent years, with respect to size, cost and ruggedness, such in-flight entertainment systems are commonly found in numerous vehicles.

One drawback to the present day utilization of in-flight entertainment systems, is the maintenance associated with the display or monitor stowage and deployment. In order to provide maximum viewing access, the physical location of the display or monitor often subjects the device to excessive stress, both planar and rotational, when deployed. Additionally, the operating environment of such entertainment systems is often characterized by high vibration and deliberate misuse in attempting to deploy or retract the display.

Accordingly, a need exists for an in-flight entertainment system incorporating a display housing system that secures stowage and deployment, while deflecting predictable extreme applied force is highly desirable, and simultaneously incorporating features that accommodate quick replacement of the housed display unit.

SUMMARY OF INVENTION

The present invention relates to an entertainment system for use in vehicular applications that comprises a mounting system for securing a flat panel display. A mounting assembly is disclosed that comprises a front and a back panel that are rigidly coupled via an integrated cam latch comprising a plurality of matched interlocking extensions along one edge of each of the respective front and back panels.

It is an object of the present invention to provide an improved mounting system for display monitors for use in passenger vehicles.

It is a feature of the present invention to incorporate an interlocking cam latch for rigidly coupling the flat panel display assembly.

It is an advantage of the present invention that flat panel displays in passenger vehicles can be mounted to withstand incidental extreme forces without the permanent failure of the mounting system, while allowing for rapid replacement of the flat panel display from the housing assembly.

These and other objects, features, and advantages are disclosed in the specification, figures, and claims of the present invention.

DETAILED DESCRIPTION

Figure 1:
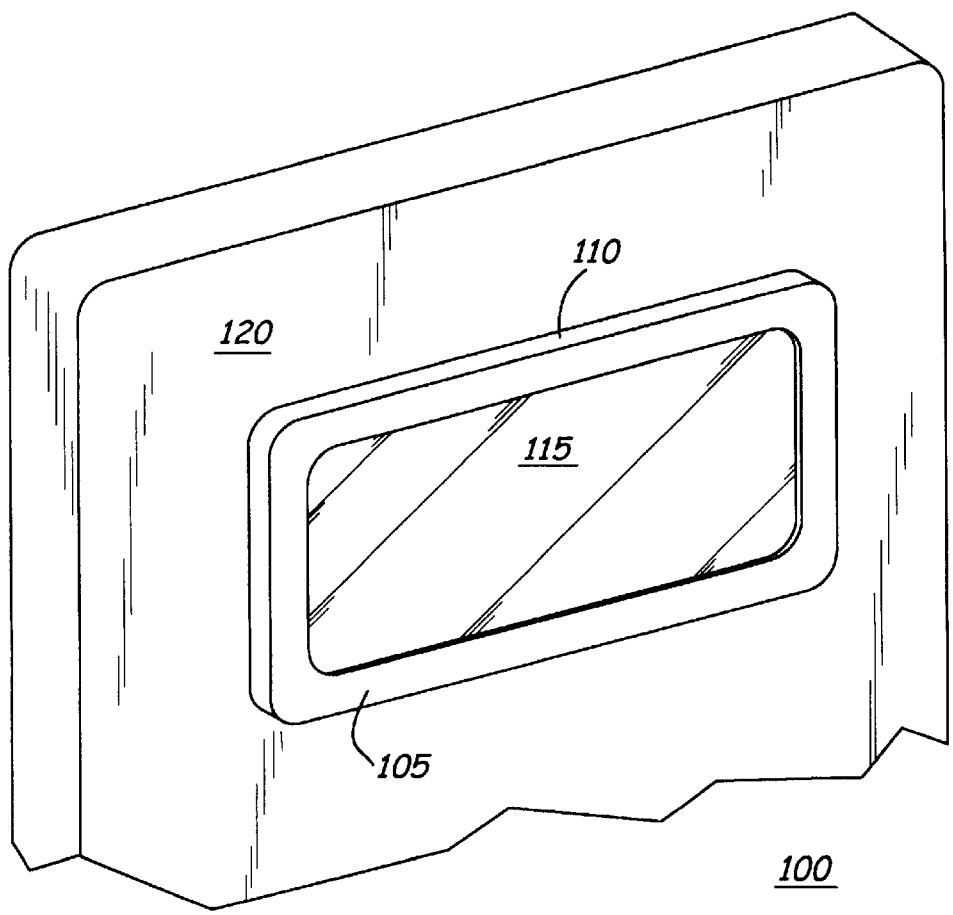
FIG. 1 is a perspective view of the display portion of an on-board entertainment system incorporating the teachings of the present invention.

Referring now to the drawings wherein like numerals refer to like matter throughout, FIG. 1 is a perspective view of the display portion 100 of an on-board entertainment system incorporating the teachings of the present invention. As depicted, the display assembly 100 is comprised of a front panel 105 and a back panel 110 that surround, support and serve as mounting assembly for a flat panel display 115. The entire display assembly is affixed to a convenient viewing surface 120, such as a bulkhead or seatback, for intended viewers of the display. Although not shown, the display assembly is coupled to additional components of the entertainment system for receiving power and content signals.

Figure 2:
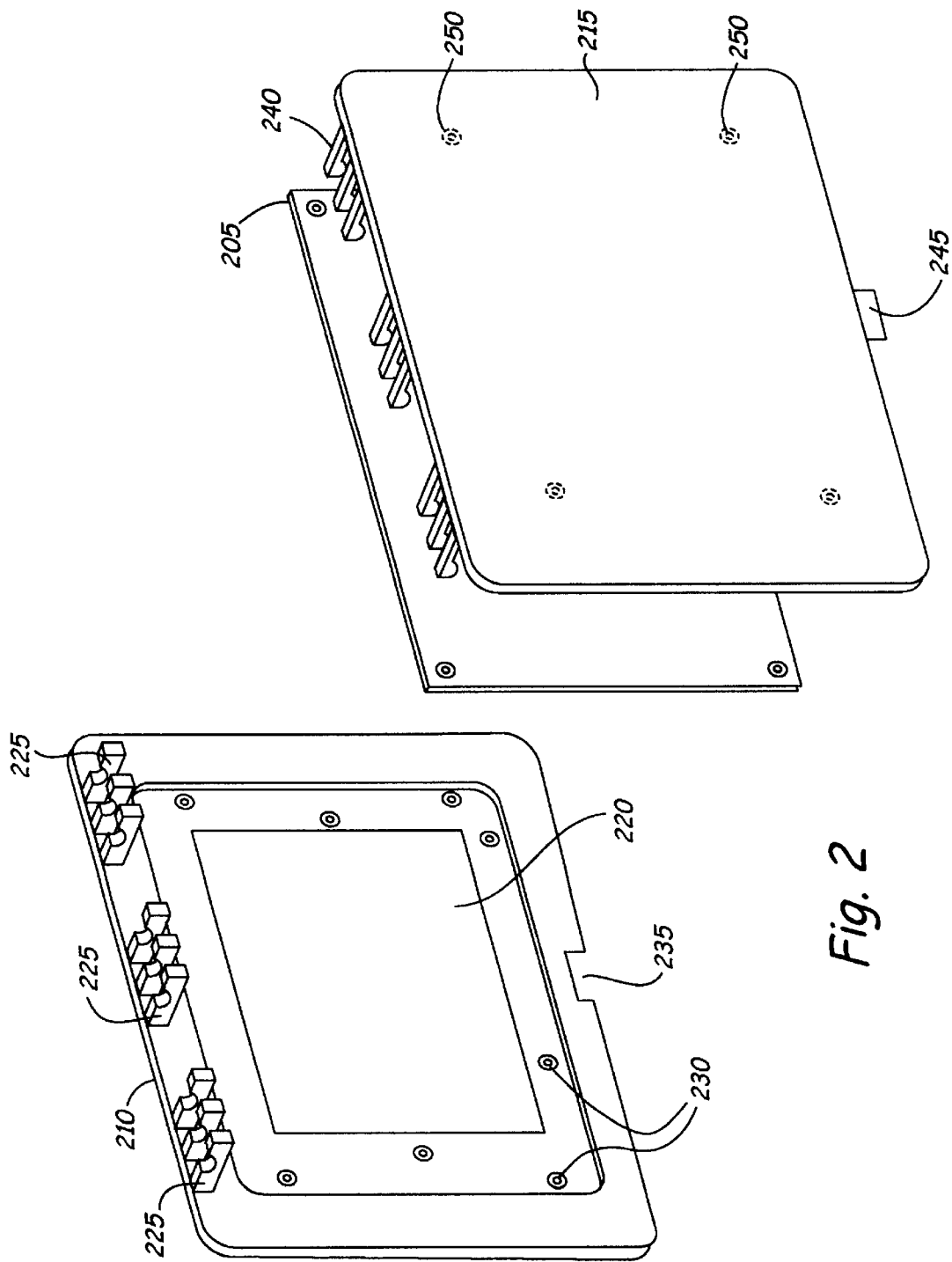
FIG. 2 is an exploded view of one embodiment of a flat panel display housing system incorporating the advantages of the present invention, as attached to a display.

FIG. 2 is an exploded view of one embodiment of a flat panel display housing system incorporating the advantages of the present invention. As depicted a flat panel display 205 is disposed between a front panel 210 and a back panel 215, said panels having an exterior and interior surface, the flat panel arranged such that the interior surface of each of said front and back panels are adjacent to the primary surfaces of the flat panel display.

The front panel 210, includes an opening 220 which provides viewing access to said flat panel 205 in the assembled display housing. The inside surface of front panel 210 includes a plurality of extensions 225 disposed along a first interior edge of said front panel 210. Additionally, a plurality of structures 230 are provided, also on the inside surface of front panel 210 for supporting the flat panel 205 within the housing assembly. A recess 235 is also integrated into front panel 210, shown on the opposite edge of the location of extensions 225.

In a similar fashion back panel 215 is provided, having similar dimensions to front panel 210, and each encompassing the perimeter of flat panel display 205. The back panel further includes a plurality of extensions 240 for interlocking with the complementary extensions 225. An integral tab 245 is provided along the opposite edge of the location of extensions 240 and proximately located for engaging recess 235, when the front panel and back panel are coupled. Support structures 250, shown in relief to indicate their location on the inside surface are also included on back panel 215 to support the flat panel display. The cam latch is created and engaged via the rotational assembly of the respective panels. In a preferred embodiment of the present invention, the edge of the panels which include the latch are located along the bottom portion of the display housing, thereby minimizing any exposed fasteners or connectors to vehicle passengers.

Figure 3:
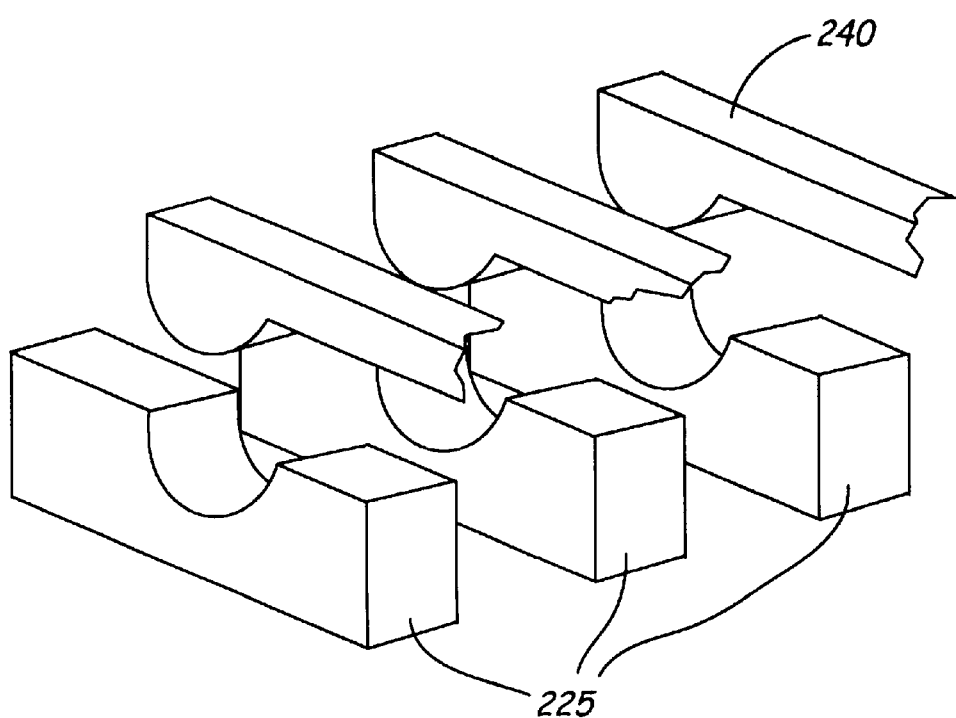
FIG. 3 is a perspective view of the latch assembly.

FIG. 3 is a perspective view of one embodiment of a portion of the latch assembly, illustrated in FIG. 2. As shown, each location of the plurality of interlocking extensions 225 and 240 are contiguous to each other and form a latch, via the rotational coupling of the panels containing the latch.

It is understood that, while the detailed drawings, specific examples, and particular values given describe preferred exemplary embodiments of the present invention, they are for the purpose of illustration only. The apparatus and method of the present invention is not limited to the precise details of the conditions disclosed. Accordingly, changes may be made to the details disclosed without departing from the spirit of the invention the scope of which should be determined by the following claims.

We claim:

1. A housing assembly for supporting a flat panel display in a passenger vehicle, said housing assembly comprising:
   a front panel that incorporates an opening to allow for viewing of a surface of a flat panel display contained within said housing assembly;
   a back panel of complementary proportion to said front panel;
   a plurality of interlocking extensions incorporated onto the interior surface of said panels, located such that upon the placement of said panels together, each panel's respective interior faces the other panel's interior surface, said interlocking extensions on a first panel forms a channel for acceptance and retention of a cam shaped portion of extensions on said second panel; and
   an integral tab located along an opposite edge of said interlocking extension location on the front panel and a recess, to engage said integral tab, located along an opposite edge of said interlocking extension location on the back panel.

* * * * *